US007913104B1

(12) United States Patent
Cory et al.

(10) Patent No.: US 7,913,104 B1
(45) Date of Patent: Mar. 22, 2011

(54) METHOD AND APPARATUS FOR RECEIVE CHANNEL DATA ALIGNMENT WITH MINIMIZED LATENCY VARIATION

(75) Inventors: Warren E. Cory, Redwood City, CA (US); Donald Stark, Palo Alto, CA (US); Dean Liu, Sunnyvale, CA (US); Clemenz Portmann, Mountain View, CA (US)

(73) Assignees: Xilinx, Inc., San Jose, CA (US); Netlogic Microsystems, Inc., Santa Clara, CA (US)

( * ) Notice: Subject to any disclaimer, the term of this patent is extended or adjusted under 35 U.S.C. 154(b) by 782 days.

(21) Appl. No.: 11/974,309

(22) Filed: Oct. 12, 2007

(51) Int. Cl.
*G06F 1/04* (2006.01)
*G06F 1/00* (2006.01)
*H04L 7/00* (2006.01)

(52) U.S. Cl. .................. 713/503; 713/500; 713/400

(58) Field of Classification Search .................. 713/503
See application file for complete search history.

(56) References Cited

U.S. PATENT DOCUMENTS

| 4,218,742 | A  | * | 8/1980  | Carlton et al. ................. 710/71  |
| 5,757,297 | A  | * | 5/1998  | Ferraiolo et al. ............. 341/100 |
| 7,317,775 | B1 | * | 1/2008  | Erhart et al. .................. 375/355 |
| 7,346,794 | B1 | * | 3/2008  | Davidson et al. ............. 713/400 |
| 7,626,523 | B2 | * | 12/2009 | Shin et al. ..................... 341/101 |
| 2002/0188816 | A1 | * | 12/2002 | Johnson et al. ............... 711/167 |
| 2003/0002516 | A1 | * | 1/2003  | Boock et al. ................... 370/412 |

OTHER PUBLICATIONS

U.S. Appl. No. 11/040,423, filed Jan. 21, 2005, Davidson, Scott Allen et al., "Method and Apparatus for Providing Clocking Phase Alignment in a Transceiver System" 37 pages, available from Xilinx, 2100 Logic Drive, San Jose, California 95124.

* cited by examiner

*Primary Examiner* — Suresh K Suryawanshi
(74) *Attorney, Agent, or Firm* — Michael T. Wallace; John J. King (57) ABSTRACT

Data and clock synchronization within a gigabit receiver is maintained throughout the data byte processing logic of the receiver by utilizing the same byte clock signal. The deserialization clock signal that is used to deserialize the received serial data stream is phase coherent with the distributed byte clock signal used within the physical coding sublayer (PCS), thus establishing reliable data transfer across the physical media attachment (PMA) and PCS layers of the gigabit receiver while maintaining a known, fixed latency. The phase relationship between a derived bit clock signal and the byte clock signal is shifted in a manner that achieves coarse data alignment within each data byte without affecting the latency. Conversely, the coarse data alignment is combined with a data alignment toggling procedure to reduce data alignment granularity with minimized latency changes.

20 Claims, 8 Drawing Sheets

METHOD AND APPARATUS FOR RECEIVE CHANNEL DATA ALIGNMENT WITH MINIMIZED LATENCY VARIATION

FIELD OF THE INVENTION

The present invention generally relates to gigabit receivers, and more particularly, to gigabit receivers that provide synchronization across multiple clock domains and data alignment while minimizing latency variation.

BACKGROUND

Communication developments in the last decade have demonstrated what seems to be a migration from parallel data input/output (I/O) interface implementations to a preference for serial data I/O interfaces. Some of the motivations for preferring serial I/O over parallel I/O include reduced system costs through reduction in pin count, simplified system designs, and scalability to meet the ever increasing bandwidth requirements of today's communication needs. Serial I/O solutions will most probably be deployed in nearly every electronic product imaginable, including IC-to-IC interfacing, backplane connectivity, and box-to-box communications.

Although the need for increased communication bandwidth continues to drive future designs, support for other communication attributes, such as synchronized, low latency modes of operation remain important as well. Furthermore, achieving bit alignment, otherwise known as comma detection, while maintaining a substantially constant latency is becoming increasingly important as advanced communication protocols requiring deterministic latency, such as the Open Base Station Architecture Initiative (OBSAI) and the Common Public Radio Interface (CPRI), are developed.

High-speed serial input/output (I/O) interfaces that support gigabit data rates often divide data communication into various protocol layers. For example, communication layer protocols at the PHY layer may be divided into the physical media attachment (PMA) layer and the physical coding sublayer (PCS). The PMA layer, for example, provides the core analog interface between the host integrated circuit (IC) and the outside world. The PCS provides various coding and word alignment features that are critical for interfacing with the media access layer (MAC).

In programmable logic devices (PLDs), such as a field programmable gate array (FPGA), the PMA and PCS PHY layers may be implemented within the hard core of the FPGA, whereas the MAC layer and the higher link transaction layers may be implemented within the programmable logic fabric of the FPGA. Clock and data recovery is performed by the PMA on the serial data received, whereby a bit clock having substantially the same frequency as the received serial data is extracted. A byte clock, that is phase coherent with the bit clock, is then generated to propagate multiple bit data words that have been created from the received serial data.

The PCS often incorporates a byte alignment block, or barrel shifter, that is commonly used to modify the data alignment within each multiple bit data word. The PCS may further incorporate a first-in, first-out (FIFO) that functions as an elastic buffer, so that phase and/or frequency differences in the off-chip data rate and the on-chip clocking rate(s) may be mitigated.

For various reasons, each of the PMA, PCS, and programmable logic fabric within an FPGA represents three separate clock domains. Thus, in order to maintain reliable data propagation across each clock domain, care must be taken to maintain a known timing relationship between the propagated data and associated sampling instances. Such a known timing relationship becomes increasingly difficult to maintain in a low latency mode of operation, since the elastic buffer in the PCS layer is bypassed.

One prior art approach of maintaining a known timing relationship across each clock domain in a low latency mode of operation is disclosed in Davidson et al., U.S. patent application Ser. No. 11/040,423 filed Jan. 21, 2005, and is incorporated herein by reference in its entirety. In particular, a master clock signal is generated and is distributed across all clock domains to maintain synchronization. The master clock signal is a byte clock signal that is derived from the incoming serial data stream via a clock and data recovery (CDR) circuit in the PMA layer. Once derived, the byte clock signal is routed to the root of a global clock tree within the programmable logic fabric of the FPGA, where it is then delivered to the PCS, as well as other portions of the programmable logic fabric, via one or more global clock trees.

Data alignment within each data word is achieved without the need for a barrel shifter through the use of a fine phase adjustment implemented within the data path between the PMA and PCS layers. The fine phase adjustment is effected by slipping the data alignment between the PMA and PCS layers in each data word by one or more successive phase offsets of 2 unit intervals (UI), i.e. bit periods, until a satisfactory data alignment is reached.

Taking a 40-bit data word, for example, each phase offset results in a 5% phase change, since 2 bit periods relative to 40 bit periods is equal to 5%. Thus, a 360*0.05=18 degree phase offset is implemented for each 2 UI phase adjustment. In achieving the desired data alignment, however, a 2 UI change in the data latency is inherently created in the data path between the PMA and PCS layers for each phase adjustment. Thus, not only is latency introduced within the data path, but the magnitude of latency created also becomes non-deterministic, or at least non-constant, which is intolerable for certain communication protocols such as OBSAI and CPRI.

Furthermore, as gigabit transceiver designs advance, a 2 UI phase adjustment in the data path could become prohibitive. For example, if the data word length were to be decreased from 40 bits to 10 bits, then a 2 UI phase adjustment would represent a 20% phase offset, i.e., 2 bit periods relative to 10 bit periods. Thus, as the data word length decreases, a corresponding increase in phase sensitivity to the UI data alignment technique is created.

Efforts continue, therefore, to provide a solution which allows a synchronous, low latency mode of operation, while at the same time, provides a data alignment mode that maintains a constant latency, or at least, minimizes changes in latency. Both modes are required to interoperate with one another, while providing known clock and data relationships across all clock domains to insure reliable data propagation throughout the communication system.

SUMMARY

To overcome limitations in the prior art and to overcome other limitations that will become apparent upon reading and understanding the present specification, various embodiments of the present invention disclose an apparatus and method for receiving channel clock synchronization and data alignment while providing substantially invariant latency.

In accordance with one embodiment of the invention, a method of minimizing data latency variation in a receiver comprises distributing a byte clock signal to multiple data processing portions of the receiver. The distributed byte clock signal is derived from a bit clock signal that is generated from received data bits. The method further comprises generating a deserialization clock signal to convert the received data bits to data bytes. The deserialization clock signal is also derived from the bit clock signal. The method further comprises aligning the data bits in each data byte by altering a phase of the deserialization and distributed byte clock signals in relation to a substantially fixed phase of the bit clock signal.

In accordance with another embodiment of the invention, a receiver comprises a clock and data recovery circuit that is coupled to receive serial data and is adapted to derive a bit clock signal and a data signal from the received serial data. The receiver further comprises a divider that is coupled to receive the bit clock signal and is adapted to convert the bit clock signal into multiple phase variants of a byte clock signal. The receiver further comprises a clock tree that is coupled to the divider and is adapted to provide one phase variant of the byte clock signal as a distributed byte clock signal. The receiver further comprises a phase select block that is coupled to the divider and is adapted to select one of the multiple phase variants of the byte clock signal as a deserialization clock signal. The receiver further comprises a deserializer that is coupled to receive the data signal and is adapted to convert the data signal into data bytes in response to the deserialization and bit clock signals. The divider is adapted to rotate a phase of the deserialization and distributed byte clock signals relative to a phase of the bit clock signal to modify alignment of data bits within each data byte.

In accordance with another embodiment of the invention, a method of aligning data in a receiver comprises converting a received data stream into a plurality of data bytes in response to a bit clock signal and a deserialization clock signal, propagating each of the plurality of data bytes into a data alignment block in response to a distributed byte clock signal until an alignment pattern is recognized within one of the propagated data bytes. The distributed byte clock signal is generated from a byte clock signal that is distributed by a clock tree. The method further comprises shifting data bits within the one of the propagated data bytes in response to the recognized alignment pattern, determining a latency generated by the shifting of the data bits, and optionally altering a phase of the deserialization clock signal and the distributed byte clock signal in relation to the bit clock signal to reduce the latency generated by the shifting of the data bits.

BRIEF DESCRIPTION OF THE DRAWINGS

Various aspects and advantages of the invention will become apparent upon review of the following detailed description and upon reference to the drawings in which.

DETAILED DESCRIPTION

Generally, the various embodiments of the present invention are applied to a gigabit receiver that receives serially transmitted data bits, collects the received data bits into one or more bytes of parallel data, and optionally performs further processing on the data bytes, such as comma detection and 8B/10B decoding. The serial data stream is deserialized in such a way that data is transferred between the several clock domains of the receiver in a reliable fashion. Further, the latency is substantially constant, regardless of any variation in the data alignment within the data byte boundaries.

Data and clock synchronization is maintained throughout the data byte processing logic by utilizing the same clock source in each clock domain, thus obviating the need for a high-latency buffer. The byte clock signal that is used by the data byte processing logic is distributed by balanced clock trees that exist within the programmable logic fabric of the programmable logic device (PLD), as well as within the hard core of the PLD.

The deserialization clock signal that is used to deserialize the received serial data stream is phase locked to the distributed byte clock signal received from the balanced clock trees. As such, reliable data transfer is established across the PMA and PCS PHY layers of the gigabit receiver while maintaining a known latency. Furthermore, the phase relationship between the bit clock signal and the deserialization clock signal may be shifted in a manner that achieves the desired data alignment within each data byte without affecting the data latency. In an alternate embodiment, data alignment is achieved with minimal changes in the data latency.

Figure 1:
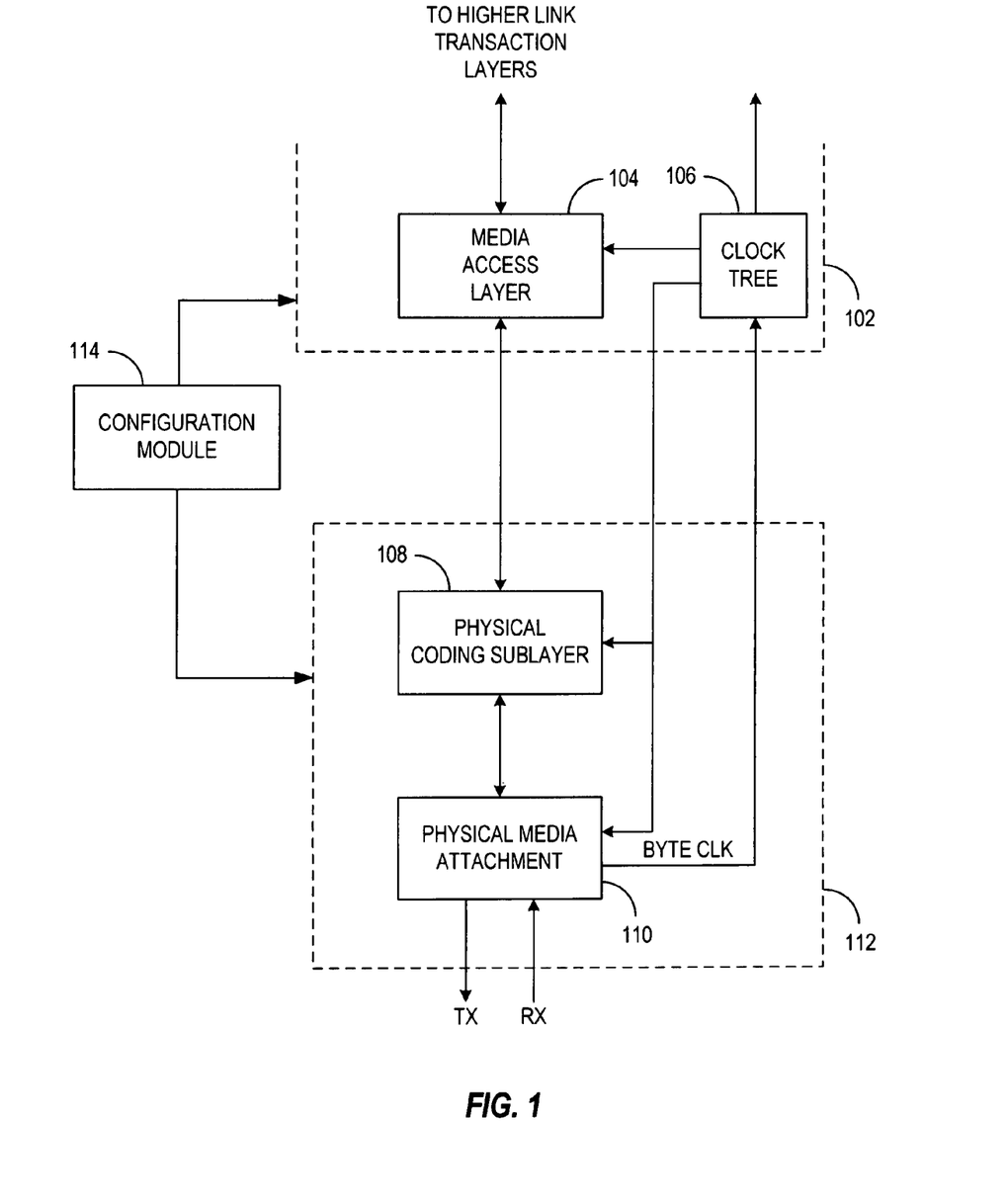
FIG. 1 illustrates an exemplary communication stack of a gigabit transceiver, in accordance with an embodiment of the present invention.

Turning to FIG. 1, an exemplary communication stack is illustrated, whereby communication protocol layers 102 and 112 are implemented within a programmable logic device (PLD) such as a field programmable gate array (FPGA). In particular, physical media attachment (PMA) layer 110 and physical coding sublayer (PCS) 108 may reside within a gigabit transceiver of the FPGA, while media access layer (MAC) 104 and the higher link transaction layers may reside within the programmable logic portion, i.e., programmable fabric and associated processing, that also resides within the FPGA.

In one embodiment, PHY layers 102 and 112 may represent an OBSAI compliant PHY interface for a single gigabit transceiver, while other communication channels (not shown) of the FPGA may be simultaneously configured for other communication protocols. PMA 110, for example, provides a serializer/deserializer (SERDES) function whereby parallel data bytes received from PCS 108 may be serialized prior to transmission via the TX interface. Similarly, serial data received from the RX interface may be converted to parallel data bytes prior to being delivered to PCS 108.

PMA 110 may also incorporate a clock and data recovery (CDR) module, whereby a bit clock signal and a data signal are derived from the input signal received at the RX interface. Once derived, the bit clock signal may be divided to form a byte clock signal, i.e., signal BYTE CLK, that is used to drive the root of one or more balanced clock trees 106. The balanced clock trees then distribute signal BYTE CLK to the parallel data processing blocks of PMA 110, PCS 108, MAC 104, and other portions of the programmable logic fabric that perform the higher link transaction layer functionality.

The deserialization clock signal that is used within PMA 110 to deserialize data received at the RX terminal is phase aligned to the bit clock signal, as well as to the clock tree distributed signal BYTE CLK, so as to maintain reliable data transfer between PMA 110 and PCS 108 with a known latency. Further, the phase relationship between the bit clock signal and the deserialization clock signal may be "slipped" by an integer number of bit clock cycles, while maintaining a fixed phase relationship between the deserialization clock signal and the distributed signal BYTE CLK. Such an arrangement allows modification of the data alignment within each parallel data byte without changing the latency in the data path between PMA 110 and PCS 108. In an alternate embodiment, a data alignment block within PCS 108 may be utilized in conjunction with the "slip clock" procedure, to obtain finer control of data alignment with minimized variation in latency between PMA 110 and PCS 108.

MAC 104, PCS 108, and PMA 110 may receive configuration information from configuration module 114. In particular, either during a configuration of the host FPGA, or a partial reconfiguration of portions of the host FPGA and transceiver sections, PHY layers 102, 112 and the higher link transaction layers of the host FPGA may be programmed to accommodate the desired operational attributes of the gigabit transceiver.

Figure 2:
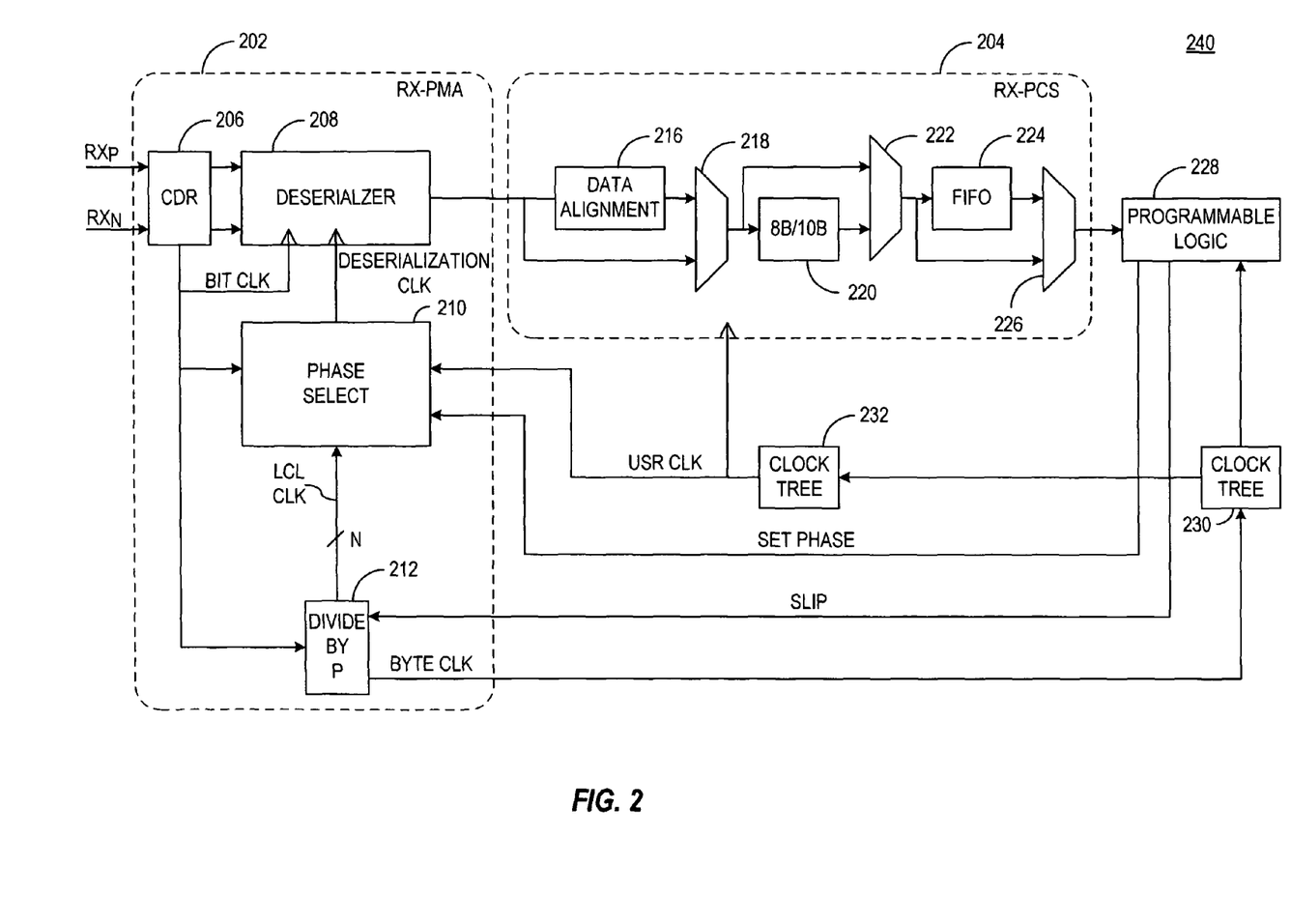
FIG. 2 illustrates an exemplary block diagram of the receive portions of the gigabit transceiver of FIG. 1, in accordance with an embodiment of the present invention.

Turning to FIG. 2, an exemplary block diagram of receive-PMA (RX-PMA) 202 and receive-PCS (RX-PCS) 204 of the gigabit transceiver of FIG. 1 is illustrated. Clock and data recovery (CDR) block 206 extracts the clock rate, i.e., signal BIT CLK, and data information from the differential serial data received at the $RX_P$ and $RX_N$ input terminals. Deserializer 208 aligns the data bits into data bytes of variable width, e.g., 8-bits or 10-bits, in accordance with signals BIT CLK and DESERIALIZATION CLK. Deserializer 208 further aligns each data byte into data words of variable width, e.g., 1 to 4 data bytes. It is noted that in a double data rate (DDR) receiver, signal BIT CLK actually operates at half the frequency of the serial data rate, since the received serial data may be detected at both rising and falling edges of signal BIT CLK.

Signal BIT CLK is also provided to Divide-by-P 212, whereby signal BIT CLK is divided into a clock signal, e.g., signal BYTE CLK, that is at a frequency equal to BIT CLK/P, where P is an integer that is equal to half of the data width of each data byte, e.g., 4 or 5, in a DDR receiver. Divide-by-P 212 then drives the root of balanced clock tree 230 with signal BYTE CLK for distribution to programmable logic block 228 within programmable logic fabric 240 as well as to balanced clock tree 232. The output of balanced clock tree 232, i.e., signal USR CLK, is then distributed to RX-PCS 204 and RX-PMA 202.

Divide-by-P 212 also provides a plurality of clock signals, LCL $CLK_0$ through LCL $CLK_N$, to phase select 210, where signals LCL $CLK_0$ through LCL $CLK_N$ constitute N possible phase variants of signal BYTE CLK. For example, N may be set to 5 when the width of the data bytes generated by deserializer 208 is equal to 10 bits. In such an instance, the first signal, LCL $CLK_0$, from Divide-by-P 212 has a phase offset relative to signal BYTE CLK of 0 degrees. In one embodiment, signal BYTE CLK is set equal to signal LCL $CLK_0$ and is then provided to balanced clock tree 230 as illustrated.

For the example of N=5, signal LCL $CLK_1$ exhibits a phase offset relative to signal LCL $CLK_0$ of 2 unit intervals (UI), i.e., bit periods, which is equal to 360*0.20=72 degrees, since 2 bits out of 10 represents a 20% phase offset. Similarly, signal LCL $CLK_2$ exhibits a phase offset relative to signal LCL $CLK_1$ of 72 degrees, LCL $CLK_3$ exhibits a phase offset relative to signal LCL $CKL_2$ of 72 degrees, and so on. Thus, signals LCL $CLK_0$ through LCL $CLK_4$ represent all possible phase variants having 2 UI phase offsets for the 10-bit case. It can be seen that for an 8-bit data byte length, the integer values of P and N become 4, whereby the phase offsets between phase variants LCL $CLK_0$ through LCL $CLK_3$ is equal to 90 degrees, i.e., 360*0.25=90, since 2 bits out of 8 represents a 25% phase offset.

Phase select 210 seeks to maintain phase coherency between clock signals USR CLK and DESERIALIZATION CLK by selecting one of phase variants LCL $CLK_0$ through LCL $CLK_N$ that is either closest in phase to signal USR CLK, or that has some other fixed, favorable phase relationship with respect to signal USR CLK. Once phase select 210 has selected the proper phase variant from Divide-by-P 212, phase select 210 then provides the proper phase variant, i.e., one of signals LCL $CLK_0$ through LCL $CLK_N$, as signal DESERIALIZATION CLK to deserializer 208. It is noted that signal SET PHASE from programmable logic 228 is used to activate phase alignment between clock signals USR CLK and DESERIALIZATION CLK during a synchronization event initiated by programmable logic 228.

By achieving the optimized phase relationship between signals USR CLK and DESERIALIZATION CLK, phase select 210 guarantees a proper timing relationship between the clock domains of RX-PMA 202 and RX-PCS 204. As such, reliable data transfer between RX-PMA 202 and RX-PCS 204 is guaranteed, since the phase difference relative to signals USR CLK and DESERIALIZATION CLK is a known value.

Bit alignment within each data byte generated by deserializer 208 may be implemented by virtue of the operation of signal SLIP from programmable logic 228. In this instance, data alignment block 216 is bypassed through the appropriate selection control of multiplexer 218. Once signal SLIP is asserted, each of signals LCL $CLK_0$ through LCL $CLK_N$ are rotated in phase by a phase offset that is equal to 2 UI. For example, a 2 UI offset for the 10-bit case represents a 72 degree phase rotation, whereas a 2 UI offset for the 8-bit case represents a 90 degree phase rotation. Thus, by fixing the phase of signal BIT CLK with respect to successive phase offsets of signal DESERIALIZATION CLK with each slip clock operation, the desired bit alignment within each data byte generated by deserializer 208 may be achieved.

It is important to note, also, that the phase of signal BYTE CLK from Divide-by-P 212 is also rotated by a 2 UI phase offset, which rotates the phase of signal BYTE CLK that is provided to balanced clock trees 230 and 232. Thus, any number of assertions of signal SLIP may effect any number of phase rotations of signals LCL $CLK_0$ through LCL $CLK_N$, USR CLK, and BYTE CLK without affecting the latency between RX-PMA 202 and RX-PCS 204. In other words, data alignment may be achieved while maintaining constant latency across all possible data alignment rotations, since the slip clock operation affects the phase of signals LCL $CLK_0$ through LCL $CLK_N$, USR CLK, and BYTE CLK in a relatively equal manner. It is further noted, that the resolution of data alignment is limited to the BIT CLK period, i.e., 2 UI, in this embodiment.

In an alternate embodiment, bit alignment, otherwise known as comma detection, within each data byte may be implemented via data alignment block 216. In this instance, data alignment block 216 is not bypassed and is instead inserted into the data path by appropriate input selection of multiplexer 218. The bit position of each bit of a data byte generated by deserializer 208 may be rotated by a barrel shifter within data alignment block 216 to achieve, for example, one of 8 bit alignments for an 8-bit data byte, or one of 10 bit alignments for a 10-bit data byte.

Data alignment using a barrel shifter within data alignment block 216 adds variability of latency, which may be unacceptable for some communication protocols. For example, a variation in latency of 7 bit periods (the difference between the minimum and maximum possible latency adjustments of 0 to 7 bit periods) may be created for an 8-bit data byte. Similarly, a worst case latency variation of 9 bit periods may be created for a 10-bit data byte. As will be discussed in more detail below, a data alignment procedure is provided that combines the data alignment operation of data alignment block 216 with the data alignment operation of the slip clock procedure to render a data alignment having an increased resolution, i.e., 1 UI, while only adding a worst case latency variation of 1 bit period.

The input data signal may also be encoded using, for example, an 8B/10B line code, whereby a DC balance is guaranteed in order to enhance clock and data recovery at block 206 when AC coupling is utilized at input terminals $RX_P$ and $RX_N$. If 8B/10B encoding is not utilized, 8B/10B decoding block 220 may be bypassed using appropriate select logic for multiplexer 222. FIFO 224 may also be bypassed during a low latency mode of operation by appropriate select logic for multiplexer 226.

As discussed above, RX-PMA 202 and RX-PCS 204 may form the receive portion of a single gigabit transceiver channel of an integrated circuit (IC), such as a PLD. One type of PLD, the field programmable gate array (FPGA), typically includes an array of programmable tiles contained within programmable logic fabric 240. These programmable tiles can include, for example, Input/Output Blocks (IOBs), Configurable Logic Blocks (CLBs), dedicated Random Access Memory Blocks (BRAM), multipliers, Digital Signal Processing blocks (DSPs), processors, clock managers, Delay Lock Loops (DLLs), and so forth.

Each programmable tile typically includes both programmable interconnect and programmable logic. The programmable interconnect typically includes a large number of interconnect lines of varying lengths interconnected by Programmable Interconnect Points (PIPs). The programmable logic implements the logic of a user design using programmable elements that may include, for example, function generators, registers, arithmetic logic, and so forth. Thus, the logic elements of programmable logic block 228, along with associated processing within programmable logic fabric 240, may be configured to implement the higher link transaction layers, as illustrated in FIG. 1, in phase coherency with signal BYTE CLK as generated by Divide-by-P 212.

Figure 3:
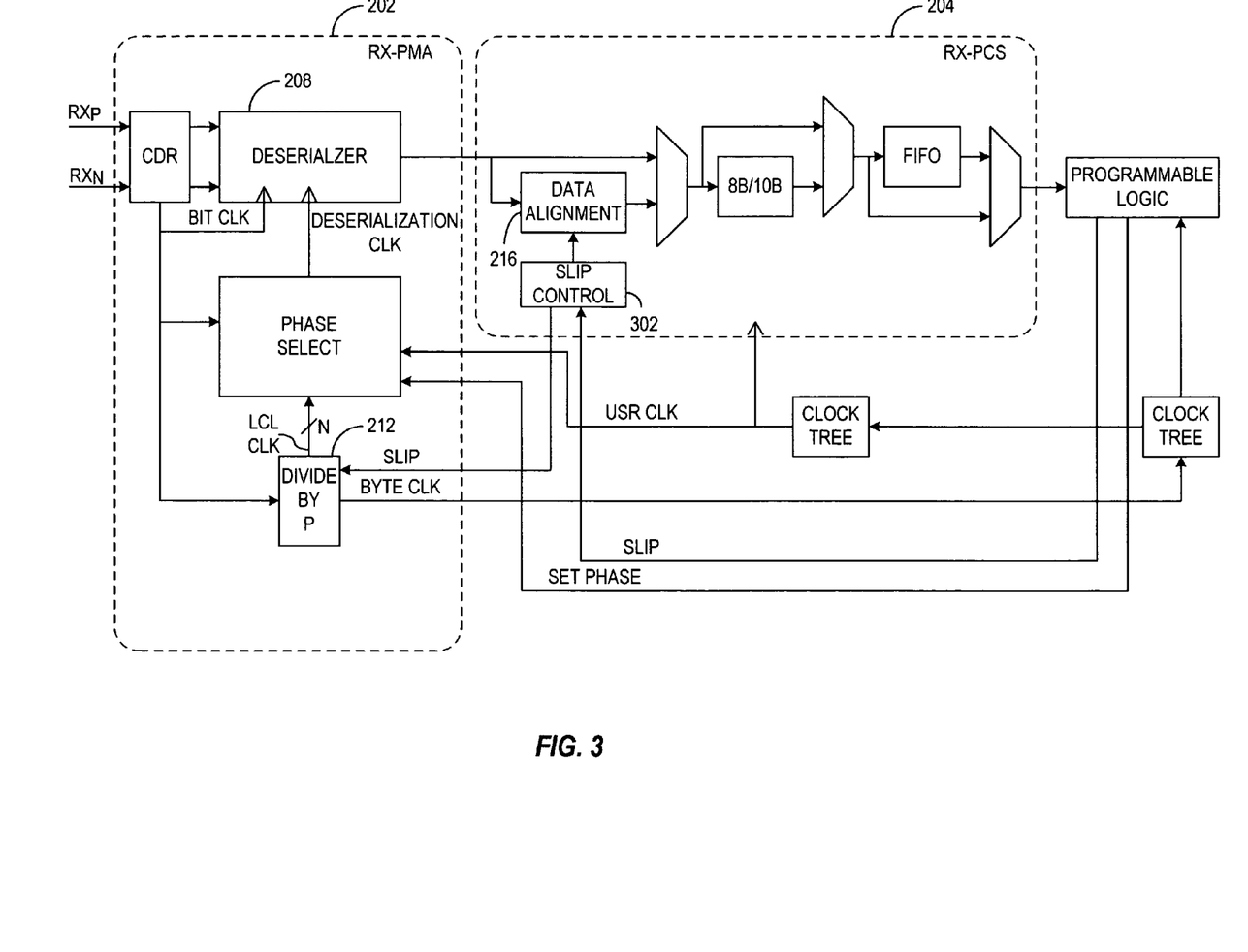
FIG. 3 exemplifies an alternate block diagram of the receive portions of the gigabit transceiver of FIG. 1, in accordance with an embodiment of the present invention.

Turning to FIG. 3, an alternate block diagram of RX-PMA 202 and RX-PCS 204 of the gigabit transceiver of FIG. 1 is exemplified. Rather than providing a phase rotation granularity of 2 UI, as discussed above in relation to FIG. 2, the block diagram of FIG. 3 exemplifies an apparatus that implements a phase rotation granularity of 1 UI.

In particular, signal SLIP is provided to slip control block 302 of RX-PCS 204, which in turn, optionally provides signal SLIP to Divide-by-P 212 to effect the 2 UI phase rotations of signals LCL $CLK_0$ through LCL $CLK_N$ and BYTE CLK as discussed above. In addition, slip control block 302 issues a toggle signal to data alignment block 216, which toggles the data alignment of data bytes received from deserializer 208 between one of two possible settings, i.e., 0 UI or 1 UI.

Thus, by optionally rotating the phase relationship between signals DESERIALIZATION CLK, USR CLK, and BIT CLK by 2 UI and by selecting a 0 UI or 1 UI data alignment setting via data alignment block 216, a phase rotation having a net 1 UI granularity is implemented. For the 10-bit data byte example, a 360*0.10=36 degree phase adjustment may be effected, since 1 bit out of 10 represents a 10% phase offset. The 8-bit data byte example similarly yields a 360*0.125=45 degree phase adjustment, since 1 bit out of 8 represents a 12.5% phase offset.

It should be noted, that the block diagram of FIG. 3 implements phase alignment between signals DESERIALIZATION CLK and USR CLK having a phase granularity that is equal to one half of the phase granularity implemented by the block diagram of FIG. 2. In so doing, however, a 1 UI variability of latency is introduced into the data path between the RX-PMA and RX-PCS blocks. Thus, while the latency is not constant, the variability of the latency is nevertheless, relatively low as compared to the implementation of data alignment via a conventional barrel shifter. Given a 10-bit data byte, for example, a conventional barrel shifter generates up to a 9 UI variability in latency depending upon the data alignment required, as compared to the 1 UI latency variability introduced by the block diagram of FIG. 3.

Figure 4:
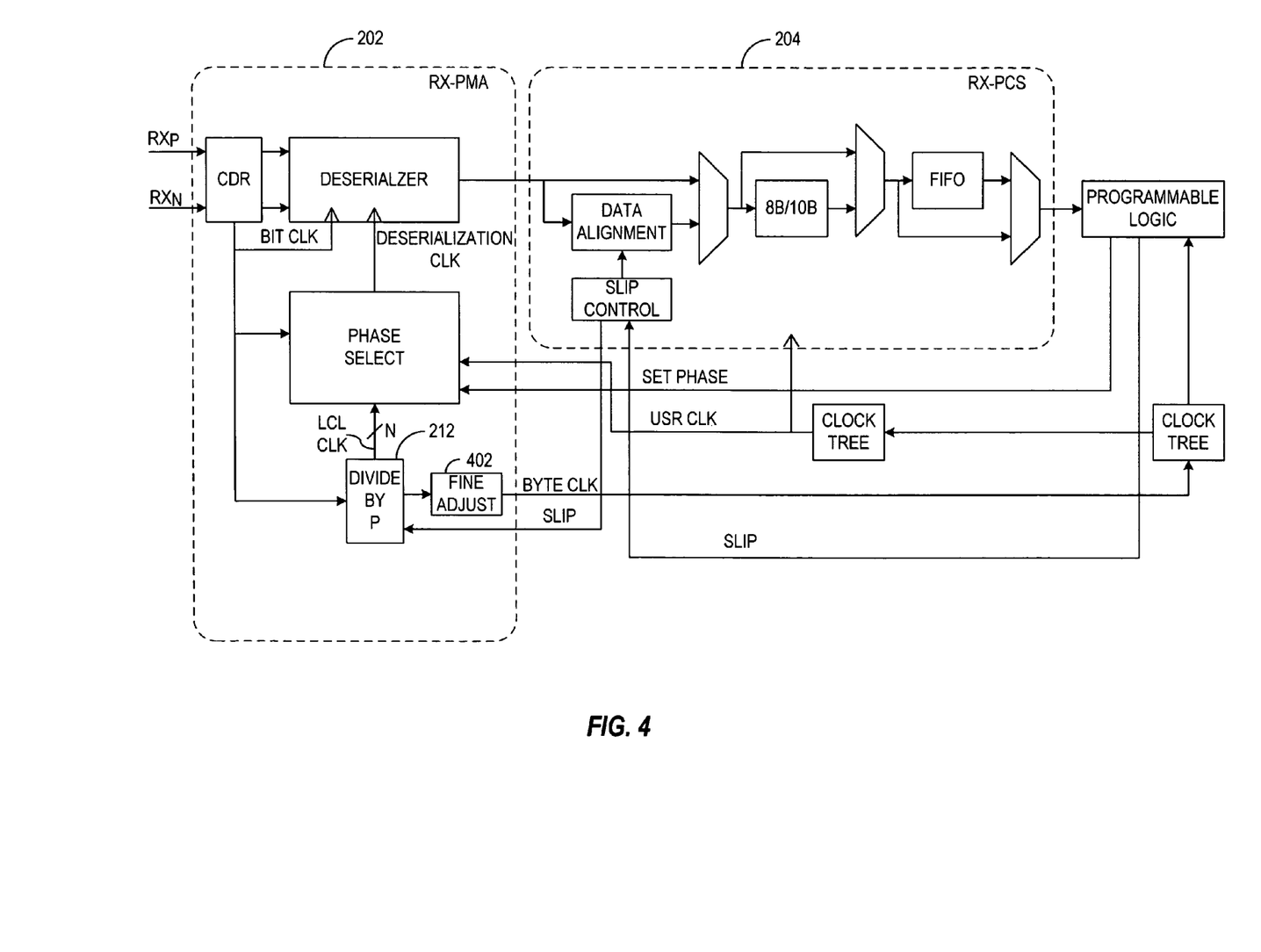
FIG. 4 exemplifies an alternate block diagram of the receive portions of the gigabit transceiver of FIG. 1, in accordance with an embodiment of the present invention.

Turning to FIG. 4, an alternate block diagram of RX-PMA 202 and RX-PCS 204 of the gigabit transceiver of FIG. 1 is exemplified. FIG. 4 is substantially identical to FIG. 3, except that fine adjust block 402 is added to the output of Divide-by-P 212, which is the clock path that provides signal BYTE CLK. As such, fine adjust block 402 may incorporate a phase adjustment having a granularity that is much less than 1 UI, thereby increasing the phase adjustment resolution that may be possible.

Given that fine adjust block 402 incorporates a 6-bit phase interpolator, for example, then for each 1 UI phase adjustment, there would exist 64 fine phase adjustment steps having a weight of 36/64=0.5625 degrees for the 10-bit case. The 8-bit case would similarly yield 45/64=0.703125 degrees of fine phase adjustment. Other phase adjustment granularities are possible, simply by adjusting the number of significant bits used by the phase interpolator.

Figure 5:
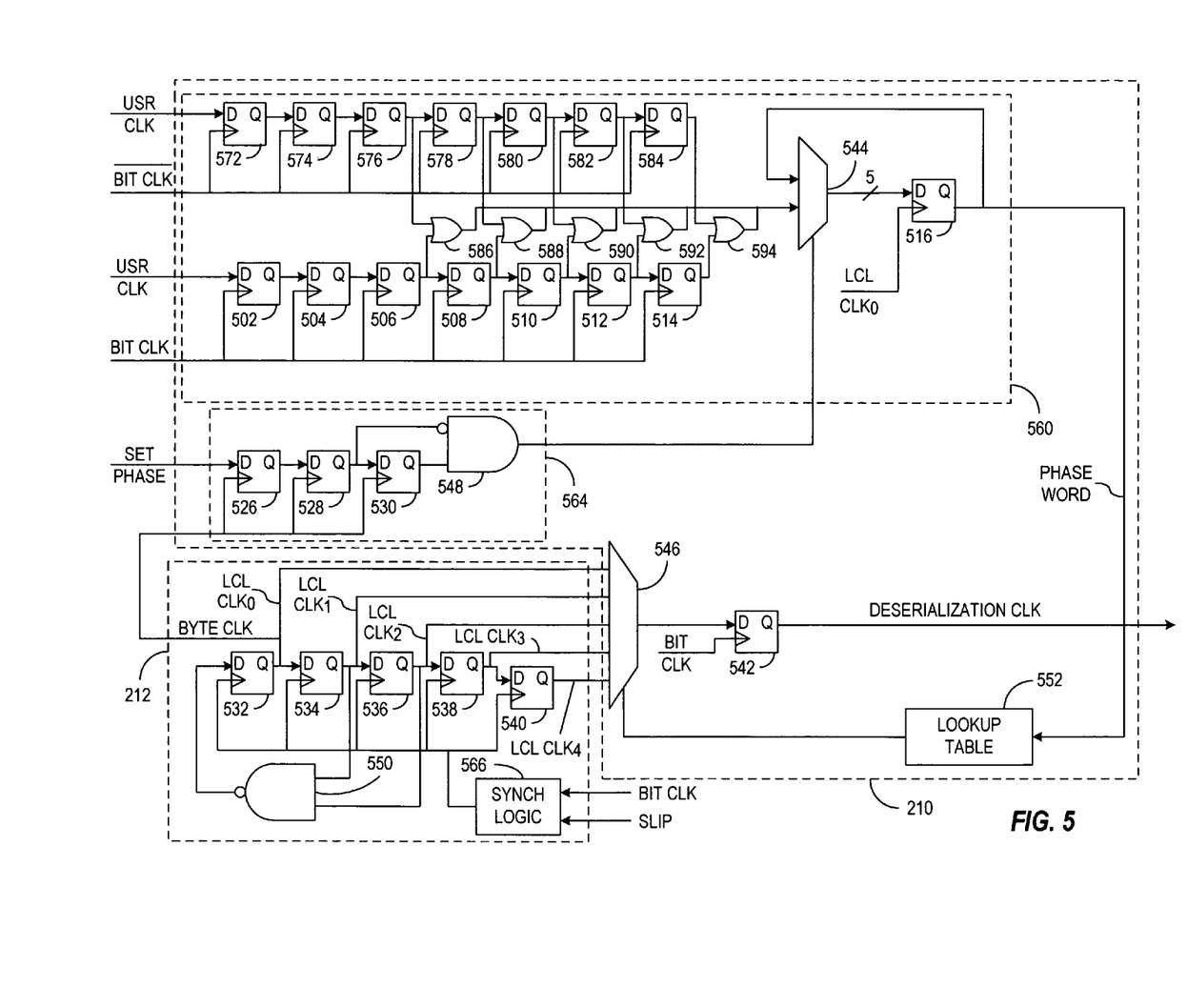
FIG. 5 illustrates an exemplary schematic diagram of the phase select and clock divider portions of FIGS. 2-4, in accordance with an embodiment of the present invention.

Turning to FIG. 5, exemplary schematic details of phase select block 210 and Divide-by-P 212 of FIGS. 2-4 are illustrated. In operation, phase detector 560 detects the phase of signal USR CLK by over-sampling signal USR CLK to obtain a "snapshot" of signal USR CLK over N periods of signal BIT CLK. It is noted, in other words, that signal BIT CLK operates at a frequency that is an integer multiple, N, of signal USR CLK, where as discussed above, N may be equal to, for example, 4 or 5, depending upon the bit width of each data byte. Thus, the snapshot of signal USR CLK provides an indication of the instantaneous phase of signal USR CLK at a particular instant in time.

Phase detector 560 optionally incorporates flip-flops 502-504 and flip-flops 572-574 to mitigate metastability. Flip-flops 506-514 are utilized to sample signal USR CLK over N sampling instances defined by the rising edge of signal BIT CLK, whereas flip-flops 576-584 are utilized to sample signal USR CLK over N sampling instances defined by the falling edge of signal BIT CLK for a DDR mode of operation. The outputs of each flip-flop pair, e.g., 506/576, 508/578, etc., are then logically ORed together via OR gates 586-594, respectively, before being applied to multiplexer 544. Since signal BIT CLK oversamples signal USR CLK by a factor of N, the "snapshot" of signal USR CLK that is presented to the first input of multiplexer 544 is expected to have a first run length of logic "0"s and a corresponding second run length of logic "1"s.

Given that N is equal to 5, for example, then a run length of two logic "1"s may be expected to be followed by a run length of three logic "0"s, as exemplified by any one of the following phase variants: "00110"; "01100"; "11000"; "10001"; or "00011". Conversely, a run length of three logic "1"s may be expected to be followed by a run length of two logic "0"s, as exemplified by any one of the following phase variants: "00111"; "01110"; "11100"; "11001"; or "10011".

Thus, the shift register, comprised of flip-flops 506-514, flip-flops 576-584, and OR gates 586-594 of phase detector 560, contains a history of signal USR CLK at any given instant in time, which is for example, 5 bits wide. Multiplexer 544 either selects a new, 5-bit history of signal USR CLK from OR gates 586-594, or multiplexer 544 selects the old, 5-bit history of signal USR CLK as stored within 5-bit shift register 516. Thus, clock signal LCL $CLK_0$, as generated by Divide-by-P 212, samples either the old or the new 5-bit history of signal USR CLK at the output of multiplexer 544 to generate a "snapshot" of signal USR CLK to form signal PHASE WORD.

Synchronizer 564 generates the select signal, as received by multiplexer 544, in order to select between the old and the new 5-bit history of signal USR CLK. In particular, synchronizer 564 is an edge detector, whereby flip-flop 526 is optionally utilized to mitigate metastability, since signal SET PHASE from programmable logic 228 is assumed to be asynchronous. The output of flip-flop 528 is provided to the inverted input of AND gate 548, while the output of flip-flop 530 is provided to the non-inverted input of AND gate 548. As such, upon a rising edge of signal SET PHASE, the output of AND gate 548 is also asserted, which causes multiplexer 544 to select a new, 5-bit history of signal USR CLK, which in turn, causes signal PHASE WORD to be updated with the new, 5-bit history. It is noted that the select signal provided by AND gate 548 is asserted for exactly one clock period of signal LCL $CLK_0$.

Look-up table 552 then receives signal PHASE WORD and maps signal PHASE WORD into a selection value that is provided to multiplexer 546, which ultimately selects one of phase variants LCL $CLK_0$ through LCL $CLK_N$ as signals DESERIALIZATION CLK. In one embodiment, look-up table 552 searches for the position of a logic pattern of "011" to exist within signal PHASE WORD and then uses that position information as the indicator of the proper phase variant to select.

In particular, lookup table 552 contains a list of predetermined phase words that are indicative of phase variants LCL $CLK_0$ through LCL $CLK_N$. Once a favorable comparison between signal PHASE WORD and one of the predetermined phase words of lookup table 552 occurs, then the associated phase variant is selected as signal DESERIALIZATION CLK via multiplexer 546. If the logic pattern "011" is not found, then some other default logic pattern may be used.

As discussed above, signal PHASE WORD is generated by phase detector 560. In an alternate embodiment, the shift register of phase detector 560 may be implemented using a single set of flip-flops, e.g., flip-flops 506-514. In such an instance, flip-flops 572-584 and OR gates 586-594 may be eliminated, whereby the output of flip-flops 506-514 may simply be routed to the input of multiplexer 544, while maintaining virtually the same functionality as discussed above. However, implementation of phase detector 560 using flip-flop sets 506-514/572-584 and OR gates 586-594 as shown, virtually guarantees that the logic pattern "011" will exist somewhere within signal PHASE WORD. Such is the case, for example, even if signal USR CLK exhibits a duty cycle that is less than 50%, e.g., 40%.

Divide-by-P 212 is a clock divider that is implemented in one embodiment as multiple memory storage elements, e.g., flip-flops, connected in series. Divide-by-P 212 is tasked with the generation of signals BYTE CLK and LCL $CLK_0$ through LCL $CLK_N$ at the correct frequency with respect to signal BIT CLK. NAND gate 550 receives the outputs of flip-flops 534 and 536 at its respective input terminals and provides the NAND result to the input of flip-flop 532. As a result, flip-flops 532-540 cycle through the following bit patterns: "00111"; "10011"; "11001"; "11100"; and "01110", where the output of any one of flip-flops 532-540 represents one phase variant, i.e., one of signals LCL $CLK_0$ through LCL $CLK_4$, that may be selected as signal DESERIALIZATION CLK by multiplexer 546. Flip-flop 542 is utilized to re-clock signal DESERIALIZATION CLK to have the proper phase relationship with respect to signal BIT CLK for proper operation of deserializer 208.

In order to implement the slip clock procedure as discussed above, synchronization logic block 566 is utilized. In particular, synchronization logic block 566 operates in similar fashion to synchronizer 564, whereby one edge of signal SLIP is detected. In response, synchronization logic block 566 deprives flip-flops 532-540 from taking new logic states, respectively, for exactly one period of signal BIT CLK. Such deprivation is implemented by utilizing the output of synchronization logic block 566 to withhold, or disable, the BIT CLK input to flip-flops 532-540 for one BIT CLK period, which delays signals DESERIALIZATION CLK and LCL $CLK_0$ through LCL $CLK_N$ by 2 UI for each assertion of signal SLIP.

Figure 6:
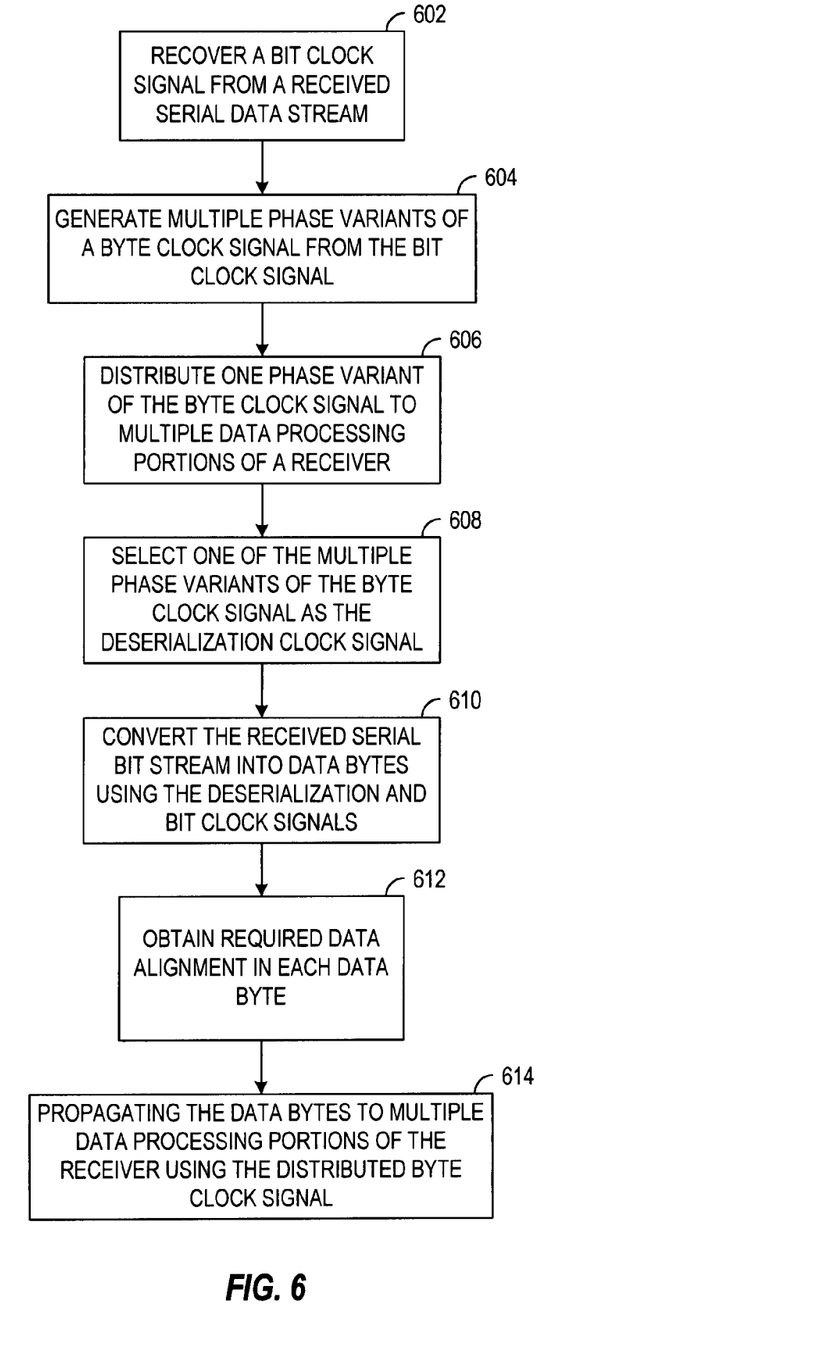
FIG. 6 illustrates an exemplary flow diagram for receive channel clock synchronization, in accordance with an embodiment of the present invention.

Turning to FIG. 6, an exemplary flow diagram illustrating receive channel data alignment with minimized latency is provided. In step 602, a clock and data recovery circuit, e.g., CDR 206, is used to recover a bit clock signal that is representative of the data rate of a received serial data stream as received by terminals, e.g., $RX_P$ and $RX_N$. In step 604, multiple phase variants of a byte clock signal, e.g., signals LCL $CLK_0$ through LCL $CLK_4$, are generated as discussed above in relation to Divide-by-P 212.

One of the multiple phase variants of the byte clock signal, e.g., signal BYTE CLK, is then distributed throughout the receiver as in step 606. Signal BYTE CLK, for example, is provided by Divide-by-P 212 and distributed via one or more clock trees, e.g., 230-232, to programmable logic 228, RX-PCS 204, and RX-PMA 202. In step 608, phase select 210 then selects one of the multiple phase variants of the byte clock signal as the deserialization clock signal. The deserialization and bit clock signals are then utilized by deserializer 208 to convert the received serial data stream into data bytes as in step 610.

A slip clock procedure is then utilized in step 612 to obtain proper data alignment in each data byte generated by deserializer 208. As discussed in more detail below, the phase of the distributed byte clock signal provided to RX-PCS 204, e.g., USR CLK, substantially matches the phase of the deserialization clock signal after each coarse phase rotation. Further, since the phase of signal BIT CLK remains substantially constant during the slip clock procedure, proper data alignment is achieved within each data byte without variation of latency. In addition, since signals DESERIALIZATION CLK and USR CLK are phase coherent with one another, propagation of data bytes from RX-PMA 202 to RX-PCS 204, as in step 614, occurs in a reliable manner.

Figure 7:
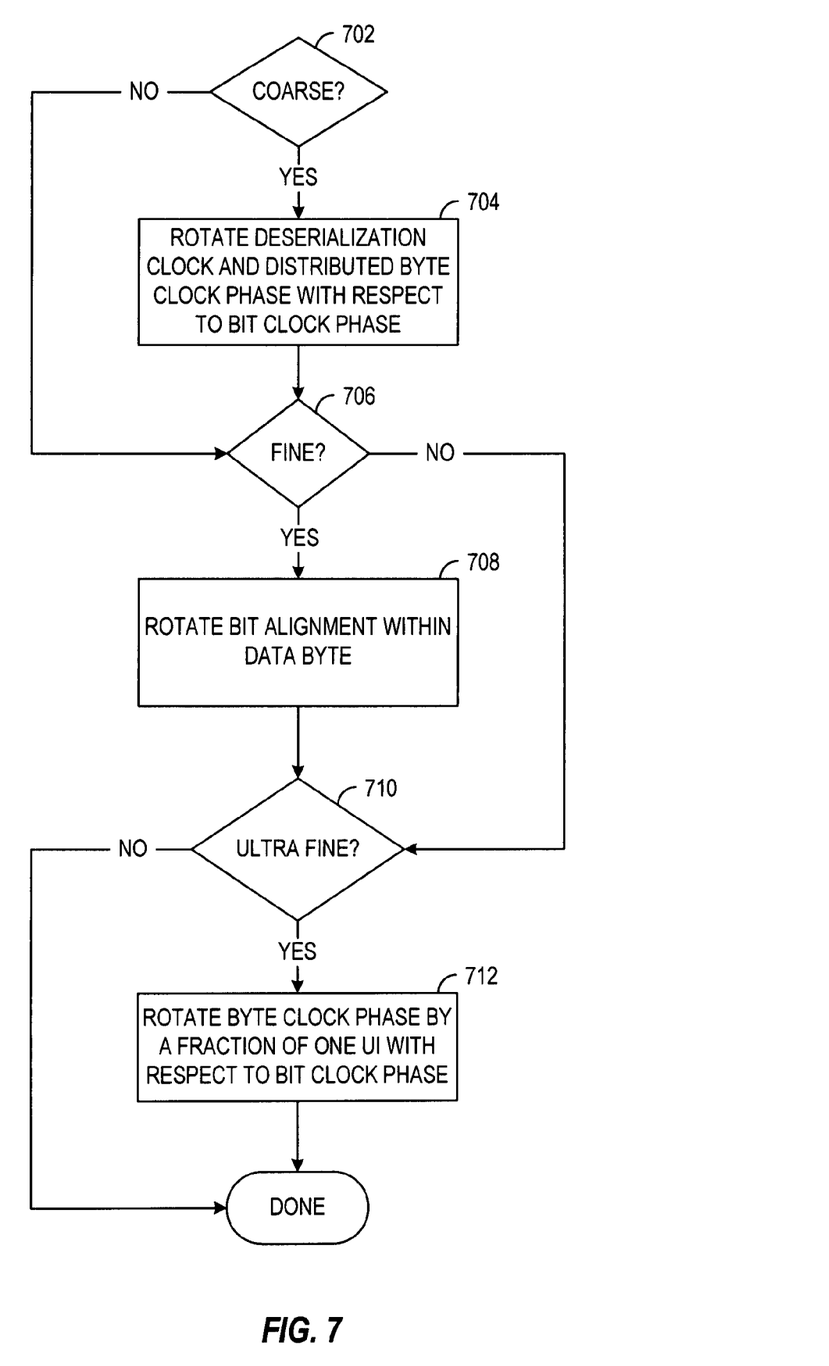
FIG. 7 illustrates an exemplary flow diagram of the slip clock procedure of FIG. 6, in accordance with an embodiment of the present invention.

Turning to FIG. 7, a flow diagram exemplifying the details of the slip clock procedure of step 612 is illustrated. Given that coarse data alignment is required, as determined in step 702 for example, each assertion of signal SLIP rotates the phase of signal DESERIALIZATION CLK and signal USR CLK with respect to the phase of signal BIT CLOCK by 2 UI as in step 704. In such an instance, SYNCH LOGIC block 566 facilitates, in response to signal SLIP, the necessary data alignment through successive phase rotations as discussed above in relation to FIG. 5, such that the phase offset between signals DESERIALIZATION CLK and USR CLK remains substantially fixed, the phase offset being equal to the phase offset established by step 608 of FIG. 6. As such, data latency between RX-PMA 202 and RX-PCS 204 remains fixed, while a 2 UI data shift per assertion of signal SLIP is nevertheless accomplished within each data byte generated by deserializer 208.

Given that each data byte contains 10 data bits, for example, each assertion of signal SLIP during coarse data alignment results in a 2 UI data offset in each data byte for a 72 degree phase rotation. If each data byte contains 8 data bits, on the other hand, each assertion of signal SLIP during coarse data alignment results in a 90 degree phase rotation. Thus, by fixing the phase of signal BIT CLK with respect to successive phase offsets of signals DESERIALIZATION CLK and USR CLK, the desired bit alignment within each data byte generated by deserializer 208 may be achieved without latency variation.

If a finer resolution in data alignment is required, as determined in step 706 for example, the granularity of phase rotation may be reduced to 1 UI, or a single bit position, while maintaining minimum variation in data latency. In particular, signal SLIP is provided to slip control block 302 of FIG. 3, which in turn, optionally provides signal SLIP to Divide-by-P 212 to effect coarse phase rotations as discussed above. In addition, slip control block 302 issues a toggle signal to data alignment block 216, which toggles the data alignment of data bytes received from deserializer 208 between one of two possible settings, i.e., 0 UI or 1 UI, as in step 708.

Thus, by optionally rotating the phase relationship between signals DESERIALIZATION CLK and BIT CLK by 2 UI and by selecting a 0 UI, or 1 UI, data alignment setting via data alignment block 216, a phase rotation having a net 1 UI granularity is implemented. For the 10-bit data byte example, therefore, a 360*0.10=36 degree phase adjustment may be effected, since 1 bit out of 10 represents a 10% phase offset. The 8-bit data byte example similarly yields a 360*0.125=45 degree phase adjustment, since 1 bit out of 8 represents a 12.5% phase offset.

If still finer data alignment resolution is required, as determined in step 710 for example, then fine adjust block 402 may be invoked. In particular, a phase interpolator may be employed within fine adjust block 402 to implement the sub-UI phase adjustment of step 712 as discussed above in relation to FIG. 4.

The slip clock procedure as exemplified by FIG. 7 may be executed more than once to effect proper data alignment and associated latency. For example, on a first pass, the coarse alignment processing of block 704 may be bypassed to allow the fine alignment processing of block 708 to obtain an intermediate data alignment. On a second pass, the coarse alignment processing of block 704 may be invoked to obtain an alternate data alignment that could not be obtained using block 708 alone without a greater variation in data latency.

In particular, the slip clock procedure may be iterated to first effect the proper data alignment via data alignment block 216, and then the associated latency may be checked for conformance to an acceptable latency magnitude, e.g., 0 UI or 1 UI. For example, on a first pass, the coarse alignment processing of block 704 may be bypassed to allow the fine alignment processing of block 708 to obtain a data alignment in response to the presence of data alignment patterns. If the first pass data alignment procedure results in an unacceptable latency, then the coarse alignment processing of block 704 may be invoked on a second pass, followed by a second invocation of the fine alignment processing of block 708. The first and second passes may be iterated with new data until acceptable data alignment and latency are obtained.

Figure 8:
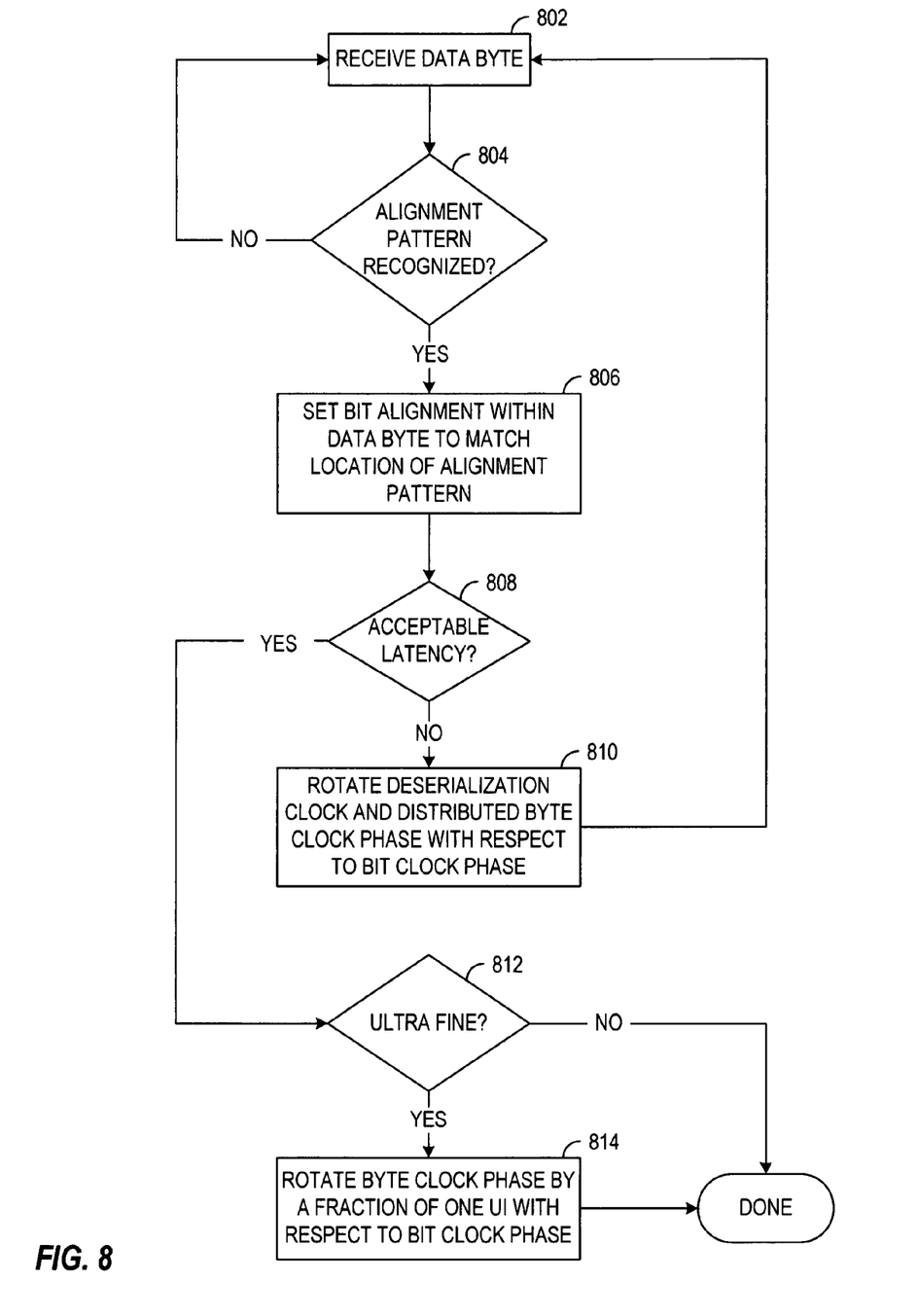
FIG. 8 illustrates an exemplary flow diagram of an iterative slip clock procedure, in accordance with an embodiment of the present invention.

Turning to FIG. 8, an exemplary flow diagram of the iterative slip clock procedure is illustrated. In particular, data alignment block 216 does not operate under the control of signal SLIP as discussed above in relation to FIG. 3. Rather, data alignment block 216 operates to set the alignment of data within a full data alignment range, e.g., one of 2*N data alignment settings, as discussed above in relation to FIG. 2. Data may be aligned in response to the presence of data alignment patterns, e.g., "commas", that are used, for example, in 8B/10B encoding.

In steps 802 and 804, data alignment block 216 is not bypassed and instead receives successive data bytes from deserializer 208 until an alignment pattern is recognized within one of the received data bytes. In step 806, data bits within the received data byte are shifted by data alignment block 216 to match the detected alignment pattern as recognized in step 804. In step 808, a determination is made as to whether the latency generated by data alignment step 806 is within reasonable limits. For example, if the bit alignment procedure results in a bit rotation of 0 or 1 UI, then an acceptable data latency is deemed to exist and processing continues as in step 812.

Conversely, if the bit alignment procedure results in a bit rotation that exceeds 1 UI, then an unacceptable latency results from operation of step 806. Step 810 is then invoked to reduce the latency to 0 or 1 UI through rotation of the phase of the deserialization and byte clock signals with respect to the bit clock signal as discussed above in relation to FIG. 3.

Since the operation of step 810 changes the data alignment as previously set in step 806, processing must repeat steps 802-810 until the appropriate data alignment and an acceptable latency are achieved. After the appropriate data alignment and acceptable latency have been achieved, step 812 is executed to determine whether sub-UI data alignment is required. If so, ultra fine data alignment of step 814 is executed as discussed above in relation to FIG. 4.

Other aspects and embodiments of the present invention will be apparent to those skilled in the art from-consideration of the specification and practice of the invention disclosed herein. For example, implementation of phase select 210 and Divide-by-P 212 may instead generate signals LCL CLK0 through LCL CLK3 operating at ¼ the frequency of signal BIT CLK and having a 90 degree phase separation with a 50% duty cycle in support of an 8-bit data byte. Other phase/frequency implementations may also be utilized to support other data byte lengths as well. It is intended, therefore, that the specification and illustrated embodiments be considered as examples only, with a true scope and spirit of the invention being indicated by the following claims.

What is claimed is:

1. A method of minimizing data latency variation in a receiver, comprising:
   distributing a byte clock signal to multiple data processing portions of the receiver, the distributed byte clock signal being derived from a bit clock signal generated from received data bits;

generating a deserialization clock signal to convert the received data bits to data bytes, the deserialization clock signal being derived from the bit clock signal; and aligning the data bits in each data byte by altering a phase of the deserialization and distributed byte clock signals in relation to a relatively fixed phase of the bit clock signal.

2. The method of claim 1 further comprising propagating the data bytes through the multiple data processing portions of the receiver using the distributed byte clock signal.

3. The method of claim 2, wherein distributing the byte clock signal to multiple data processing portions of the receiver comprises providing the byte clock signal to one or more clock trees for distribution.

4. The method of claim 3, wherein generating the deserialization clock signal comprises sampling the distributed byte clock signal at a plurality of sampling instances to generate a phase word, the phase word being indicative of an instantaneous phase of the distributed byte clock signal.

5. The method of claim 4, wherein generating the deserialization clock signal further comprises:
generating a plurality of phase variants of the byte clock signal;
comparing the phase word to a predetermined logic pattern; and
selecting one of the plurality of phase variants of the byte clock signal as the deserialization clock signal in response to the comparison.

6. The method of claim 5, wherein aligning the data bits in each data byte comprises successively delaying the distributed byte clock signal and the deserialization clock signal by one period of the bit clock signal until a required data alignment is obtained.

7. The method of claim 6, wherein aligning the data bits in each data byte further comprises maintaining a substantially constant phase difference between the distributed byte clock signal and the deserialization clock signal to maintain a substantially constant latency of the propagated data bytes.

8. The method of claim 6, wherein aligning the data bits in each data byte further comprises:
storing each propagated data byte in a data alignment block; and
shifting bit positions of each propagated data byte within the data alignment block by up to one bit position.

9. The method of claim 6, wherein aligning the data bits in each data byte further comprises delaying the byte clock signal by a fraction of a period of the bit clock signal.

10. A receiver, comprising:
a clock and data recovery circuit coupled to receive serial data and adapted to derive a bit clock signal and a data signal from the received serial data;
a divider coupled to receive the bit clock signal and adapted to convert the bit clock signal into multiple phase variants of a byte clock signal;
a clock tree coupled to the divider and adapted to provide one phase variant of the byte clock signal as a distributed byte clock signal;
a phase select block coupled to the divider and adapted to select one of the multiple phase variants of the byte clock signal as a deserialization clock signal;
a deserializer coupled to receive the data signal and adapted to convert the data signal into data bytes in response to the deserialization and bit clock signals; and
wherein the divider is adapted to rotate a phase of the deserialization and distributed byte clock signals relative to a phase of the bit clock signal to modify alignment of data bits within each data byte.

11. The receiver of claim 10, wherein the divider comprises:
a first plurality of memory storage elements coupled in series, each memory storage element being enabled to change stored logic states in response to the bit clock signal;
a first logic gate having an input coupled to an output of at least two of the first plurality of memory storage elements and having an output coupled to an input of a first memory storage element of the first plurality of memory storage elements; and
a synchronization logic block coupled to receive a slip signal and adapted to disable the first plurality of memory storage elements from changing logic states in response to an assertion of the slip signal.

12. The receiver of claim 11, wherein the divider further comprises a first multiplexer having an input coupled to an output of each of the first plurality of memory storage elements.

13. The receiver of claim 12, wherein the phase select block comprises:
a phase detector coupled to receive the distributed byte clock signal and adapted to sample the distributed byte clock signal in response to transitions of the bit clock signal to provide a phase word, the phase word being indicative of an instantaneous phase of the distributed byte clock signal; and
a second multiplexer coupled to the phase detector and adapted to provide the phase word at an output of the multiplexer in response to a select signal.

14. The receiver of claim 13, wherein the phase detector comprises:
a second plurality of memory storage elements coupled in series to receive the distributed byte clock signal and adapted to sample the distributed byte clock signal at first transitions of the bit clock signal; and
a third plurality of memory storage elements coupled in series to receive the distributed byte clock signal and adapted to sample the distributed byte clock signal at second transitions of the bit clock signal.

15. The receiver of claim 14, wherein the phase detector further comprises a plurality of logic gates, each of the plurality of logic gates having an input coupled to an output of one memory storage element from each of the second and third plurality of memory storage elements and adapted to provide one bit of the phase word to one input of the second multiplexer.

16. The receiver of claim 15, wherein the phase select block further comprises a lookup table coupled to receive the phase word from the second multiplexer and adapted to compare the phase word to a predetermined logic pattern, wherein a result of the comparison is applied to a select input of the first multiplexer to determine which of the multiple phase variants of the byte clock signal is selected as the deserialization clock signal.

17. A method of aligning data in a receiver, comprising:
converting a received data stream into a plurality of data bytes in response to a bit clock signal and a deserialization clock signal;
propagating each of the plurality of data bytes into a data alignment block in response to a distributed byte clock signal until an alignment pattern is recognized within one of the propagated data bytes, the distributed byte clock signal being generated from a byte clock signal that is distributed by a clock tree;
shifting data bits within the one of the propagated data bytes in response to the recognized alignment pattern;

determining a latency generated by the shifting of the data bits; and optionally altering a phase of the deserialization clock signal and the distributed byte clock signal in relation to the bit clock signal to reduce the latency generated by the shifting of the data bits.

18. The method of claim 17, wherein optionally altering a phase of the deserialization clock signal and the distributed byte clock signal comprises:

sampling the distributed byte clock signal at a plurality of sampling instances to generate a phase word, the phase word being indicative of an instantaneous phase of the distributed byte clock signal;

generating a plurality of phase variants of the byte clock signal;

comparing the phase word to a predetermined logic pattern; and selecting one of the plurality of phase variants of the byte clock signal as the deserialization clock signal in response to the comparison.

19. The method of claim 18, wherein optionally altering a phase of the deserialization clock signal and the distributed byte clock signal further comprises successively delaying the distributed byte clock signal and the deserialization clock signal by one period of the bit clock signal until the latency generated by the shifting of the data bits does not exceed one period of the bit clock signal.

20. The method of claim 19, wherein optionally altering a phase of the deserialization clock signal and the distributed byte clock signal further comprises maintaining a substantially constant phase difference between the distributed byte clock signal and the deserialization clock signal to maintain a substantially constant latency generated by the shifting of the data bits.

* * * * *